US011522730B2

(12) United States Patent
Asthana et al.

(10) Patent No.: US 11,522,730 B2
(45) Date of Patent: Dec. 6, 2022

(54) CUSTOMIZED MEETING NOTES

(71) Applicant: International Business Machines Corporation, Armonk, NY (US)

(72) Inventors: Ruchi Asthana, New York, NY (US); Jennifer A. Mallette, Vienna, VA (US); Steven Ware Jones, Astoria, NY (US); Nicholas Fong, Fort Lee, NJ (US); Vivek Salve, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 17/062,957

(22) Filed: Oct. 5, 2020

(65) Prior Publication Data

US 2022/0109585 A1 Apr. 7, 2022

(51) Int. Cl.
*G06F 40/169* (2020.01)
*H04L 12/18* (2006.01)
*G06F 40/35* (2020.01)
*G06F 40/289* (2020.01)

(52) U.S. Cl.
CPC ........ *H04L 12/1831* (2013.01); *G06F 40/169* (2020.01); *G06F 40/289* (2020.01); *G06F 40/35* (2020.01)

(58) Field of Classification Search
CPC .. G06F 40/169; G06F 3/04842; G06F 16/345; G06F 40/35; G06F 40/289; H04L 12/1831
See application file for complete search history.

(56) References Cited

U.S. PATENT DOCUMENTS

| 7,962,525 | B2 | 6/2011 | Kansal |
| 9,560,152 | B1 | 1/2017 | Jamdar et al. |
| 9,858,244 | B1 * | 1/2018 | Bjorkegren ............ G06Q 30/06 |

(Continued)

FOREIGN PATENT DOCUMENTS

WO 2002013522 A2 7/2002

OTHER PUBLICATIONS

"Automatic Summarization of Meeting Data: A Feasible Study", Printed Jan. 29, 2020, 3 pages, <http://www.cs.ru.nl/~kraaijw/pubs/Keyword/papers/meeting_sum_tno.pdf>.

*Primary Examiner* — Wilson W Tsui
(74) *Attorney, Agent, or Firm* — Stephanie L. Carusillo (57) ABSTRACT

In an approach to customizing meeting notes, a computer receives audio input of a virtual meeting, converts the audio input to text, and displays the text to a plurality of meeting participants. A computer receives highlighted phrases of the text from the plurality of meeting participants and determines a highlighting frequency of each of the highlighted phrases. A computer determines phrases with a highlighting frequency greater than a pre-defined threshold. A computer orders the phrases based on a chronological order of the phrases in the audio input. A computer determines preferences of a first meeting participant associated with a meeting summary. A computer generates a customized summary of the virtual meeting for the first meeting participant of the plurality of meeting participants based on the ordered phrases with a high frequency of highlighting and on the preferences. A computer transmits the customized summary to the first meeting participant.

17 Claims, 9 Drawing Sheets

(56) References Cited

U.S. PATENT DOCUMENTS

| | | | |
|---|---|---|---|
| 9,875,225 B1* | 1/2018 | Grueneberg | H05K 999/99 |
| 10,453,353 B2* | 10/2019 | Russell | G06F 40/284 |
| 2005/0171926 A1 | 8/2005 | Thione et al. | |
| 2007/0129942 A1* | 6/2007 | Ban | G06F 40/169 |
| | | | 704/235 |
| 2013/0325972 A1 | 12/2013 | Boston et al. | |
| 2014/0040256 A1* | 2/2014 | White-Sullivan | G06F 16/437 |
| | | | 707/734 |
| 2014/0149883 A1* | 5/2014 | Anand | G06F 3/04842 |
| | | | 715/751 |
| 2014/0278377 A1 | 9/2014 | Peters et al. | |
| 2014/0278405 A1* | 9/2014 | Peters | G10L 15/1822 |
| | | | 704/235 |
| 2015/0066935 A1 | 3/2015 | Peters et al. | |
| 2015/0149540 A1* | 5/2015 | Barker | H04L 12/1831 |
| | | | 709/204 |
| 2015/0287434 A1* | 10/2015 | Hall | G10L 15/26 |
| | | | 704/201 |
| 2020/0211561 A1* | 7/2020 | Degraye | G10L 15/30 |

\* cited by examiner

The study and development of artificial intelligence (AI) systems aim at building computer systems able to perform tasks that normally require human intelligence. AI-based machines are intended to perceive their environment and take actions that optimize their level of success. Today's AI can be considered weak, in that it is designed to perform narrow and specific tasks. The goal of many researchers is to create strong AI that learns like a human and can solve human-type problems. AI research uses techniques from many fields, such as computer science, philosophy, linguistics, economics, speech recognition, and psychology, which are manifested in applications, such as control systems, natural language processing, facial recognition, speech recognition, analytics, pattern matching, data mining, and logistics. Cognitive computing is among the subdisciplines that shape AI. It is about putting together a system that combines the best of human and machine capabilities. Consider capabilities that humans naturally have, such as imagination and emotions, combined with capabilities that computers excel at, such as number crunching, identifying patterns, and processing huge amounts of information. Cognitive computing uses machine strengths to "simulate" the human thought processes in a computerized model. Cognitive systems use techniques, such as machine learning, data mining, natural language processing, and pattern matching to mimic how a human brain works. Such systems are ideal to interact with an increasingly complex world.

301 Participant

FIG. 3B

*The study and development of artificial intelligence (AI) systems aim at building computer systems able to perform tasks that normally require human intelligence. AI-based machines are intended to perceive their environment and take actions that optimize their level of success. Today's AI can be considered weak, in that it is designed to perform narrow and specific tasks. The goal of many researchers is to create strong AI that learns like a human and can solve human-type problems.* AI research uses techniques from many fields, such as computer science, philosophy, linguistics, economics, speech recognition, and psychology, which are manifested in applications, such as control systems, natural language processing, facial recognition, speech recognition, analytics, pattern matching, data mining, and logistics. *Cognitive computing is among the subdisciplines that shape AI. It is about putting together a system that combines the best of human and machine capabilities. Consider capabilities that humans naturally have, such as imagination and emotions, combined with capabilities that computers excel at, such as number crunching, identifying patterns, and processing huge amounts of information.* Cognitive computing uses machine strengths to "simulate" the human thought processes in a computerized model. Cognitive systems use techniques, such as machine learning, data mining, natural language processing, and pattern matching to mimic how a human brain works. Such systems are ideal to interact with an increasingly complex world.

302
*Participant*

FIG. 3C

The study and development of artificial intelligence (AI) systems aim at building computer systems able to perform tasks that normally require human intelligence. AI-based machines are intended to perceive their environment and take actions that optimize their level of success. Today's AI can be considered weak, in that it is designed to perform narrow and specific tasks. The goal of many researchers is to create strong AI that learns like a human and can solve human-type problems. AI research uses techniques from many fields, such as computer science, philosophy, linguistics, economics, speech recognition, and psychology, which are manifested in applications, such as control systems, natural language processing, facial recognition, speech recognition, analytics, pattern matching, data mining, and logistics. Cognitive computing is among the subdisciplines that shape AI. It is about putting together a system that combines the best of human and machine capabilities. Consider capabilities that humans naturally have, such as imagination and emotions, combined with capabilities that computers excel at, such as number crunching, identifying patterns, and processing huge amounts of information. Cognitive computing uses machine strengths to "simulate" the human thought processes in a computerized model. Cognitive systems use techniques, such as machine learning, data mining, natural language processing, and pattern matching to mimic how a human brain works. Such systems are ideal to interact with an increasingly complex world.

303
Participant

FIG. 3D

| Highlighted Phrase | Participant | Frequency | Sentence |
|---|---|---|---|
| AI-based machines are intended to perceive their environment and take actions that optimize their level of success. | 301 | 1 | 2 |
| speech cognition | 301, 303 | 2 | 5 |
| Cognitive computing | 301, 303 | 3 | 6 |
| It is about putting together a system that combines the best of human and machine capabilities. | 301 | 1 | 7 |
| Cognitive systems use techniques, such as machine learning, data mining, natural language processing, and pattern matching to mimic how a human brain works. | 301, 302 | 2 | 10 |
| The study and development of artificial intelligence (AI) systems aim at building computer systems able to perform tasks that normally require human intelligence. | 302 | 1 | 1 |
| The goal of many researchers is to create strong AI that learns like a human and can solve human-type problems. | 302 | 1 | 4 |
| Cognitive computing is among the subdisciplines that shape AI. | 302 | 1 | 6 |
| Consider capabilities that humans naturally have, such as imagination and emotions, combined with capabilities that computers excel at, such as number crunching, identifying patterns, and processing huge amounts of information. | 302 | 1 | 8 |
| Today's AI can be considered weak | 303 | 1 | 3 |
| human-type problems | 303 | 2 | 4 |
| combines the best of human and machine capabilities | 303 | 2 | 7 |
| identifying patterns | 303 | 2 | 8 |
| machine learning | 303 | 3 | 10 |
| natural language processing | 303 | 3 | 10 |

CUSTOMIZED MEETING NOTES

BACKGROUND OF THE INVENTION

The present invention relates generally to the field of virtual meetings, and more particularly to customizing meeting notes.

Advances in communications and information technology have allowed for greater collaboration and streamlined processes within an organization. As a result, the need for an individual's physical presence has been reduced in at least some situations. For instance, meetings between two or more individuals are a regular part of any organizational environment. When meeting participants are located in different locations, an in-person meeting may not be practical. Instead, a meeting can be conducted virtually such that the two or more participants interact with one another remotely.

Speech or voice recognition is an interdisciplinary subfield of computational linguistics that develops methodologies and technologies that enable the recognition and translation of spoken language into text by computers. Speech recognition is also known as automatic speech recognition (ASR), computer speech recognition, or speech to text (STT). Speech recognition incorporates knowledge and research in the linguistics, computer science, and electrical engineering fields.

SUMMARY

Embodiments of the present invention disclose a method, a computer program product, and a system for customizing meeting notes. The method may include one or more computer processors receiving audio input of a virtual meeting. One or more computer processors convert the audio input to text. One or more computer processors display the text to a plurality of meeting participants. One or more computer processors receive one or more highlighted phrases of the text from the plurality of meeting participants. One or more computer processors determine a frequency of highlighting of each of the one or more highlighted phrases. One or more computer processors determine one or more phrases with a frequency of highlighting greater than a pre-defined threshold. One or more computer processors order the one or more phrases with a high frequency of highlighting based on a chronological order of the phrases in the audio input. One or more computer processors determine one or more preferences of a first meeting participant of the plurality of meeting participants associated with a meeting summary. One or more computer processors generate a customized summary of the virtual meeting for the first meeting participant of the plurality of meeting participants based on the ordered one or more phrases with a high frequency of highlighting and on the one or more preferences. One or more computer processors transmit the customized summary to the first meeting participant of the plurality of meeting participants.

DETAILED DESCRIPTION

Corporate employees may be invited to and attend many meetings. Often, meetings may conflict such that an employee may only be able to attend a portion of a meeting, or not be able to attend at all. While an employee may attend a fraction of a meeting, the employee may need information from the entire meeting. Meeting notes transcribed by a single attendee are often suggested as a solution to such issues, where participants may be connecting to and dropping off a conference call or video conference. Meeting notes are important because they enable invitees to stay on the same page and focus on common goals that need to be achieved before the next meeting. While the concept of meeting notes is good, the idea of having a single participant annotate the meeting may be detrimental because there is a burden on the single participant and the single participant may bias the meeting summary toward points the single participant found important. Embodiments of the present invention recognize that improvements to meeting note taking may be achieved by implementing a collaborative, yet system-generated, approach to generating meeting summaries. Embodiments of the present invention also recognize that efficiency may be gained by customizing meeting summaries to participants based on criteria such as preferences and/or job roles. Implementation of embodiments of the invention may take a variety of forms, and exemplary implementation details are discussed subsequently with reference to the Figures.

Figure 1:
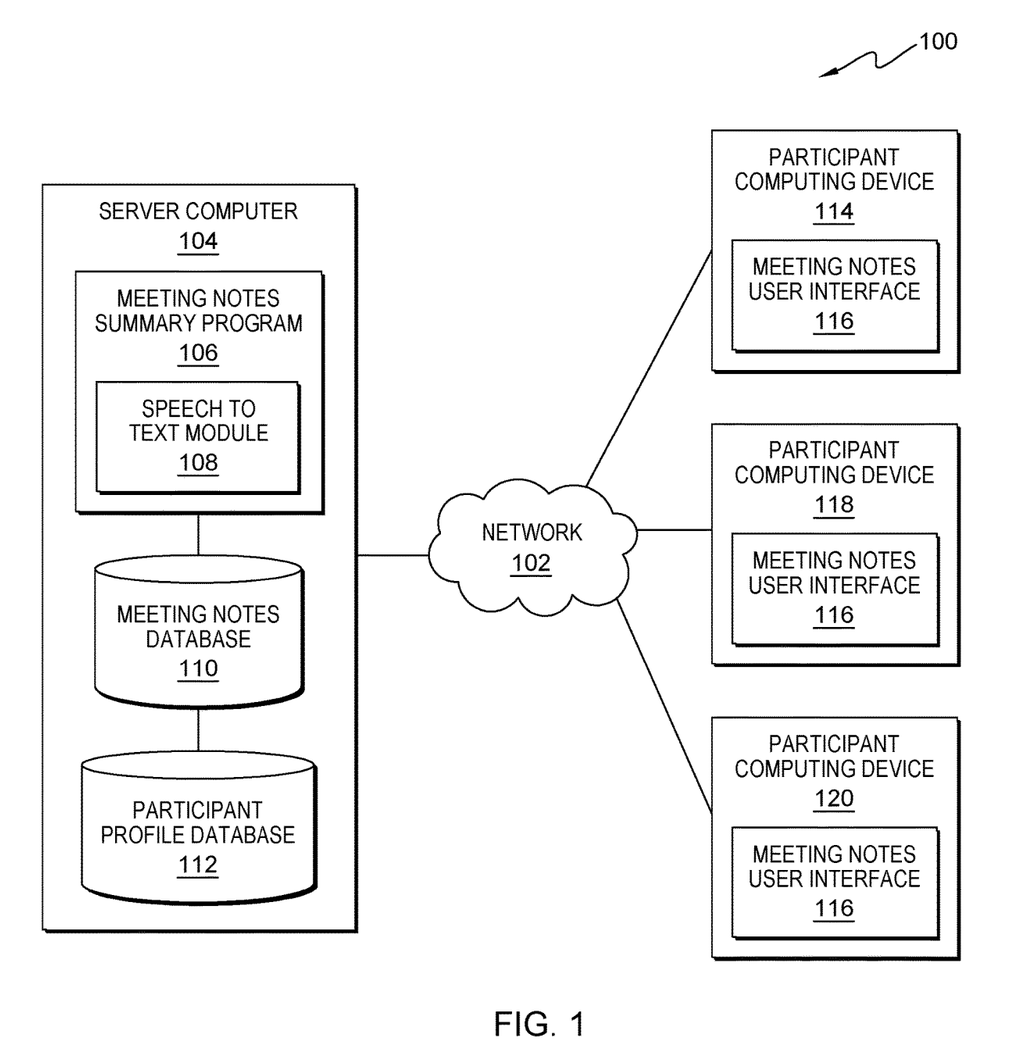
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and participant computing devices 114, 118, and 120, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, participant computing devices 114, 118, and 120, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with participant computing device 114, participant computing device 118, participant computing device 120, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes meeting notes summary program 106, meeting notes database 110, and participant profile database 112. Server computer 104 may include internal and external hardware components, as depicted and described in further detail with respect to FIG. 6.

Meeting notes summary program 106 provides customized summaries of virtual meetings by transcribing speaker utterances, i.e., audible language of a speaker, such that participants can highlight segments of the text considered important and combining the highlighted text to create a representative generative summary of the meeting. Meeting notes summary program 106 receives audio input of a virtual meeting and converts the speech from the audio input to text. Meeting notes summary program 106 displays the text to the virtual meeting participants. Meeting notes summary program 106 receives highlighted selections of the text from the participants. Meeting notes summary program 106 determines the frequency that each phrase is highlighted and assigns a weight to the phrase based on the frequency. As used herein, the term frequency refers to a number of times or quantity a phrase, sentence, or other text is highlighted by participants of a virtual meeting. Meeting notes summary program 106 stores the highlighted phrases by participant. Meeting notes summary program 106 normalizes the weighted frequency. Meeting notes summary program 106 determines which phrases have the greatest highlight frequency. Meeting notes summary program 106 determines whether any of the highlighted phrases are from the same sentence but are not intersecting. If meeting notes summary program 106 determines any of the highlighted phrases are from the same sentence but are not intersecting, then meeting notes summary program 106 recursively extracts lower weighted phrases that contain the highly weighted phrases. Meeting notes summary program 106 orders the selected highlighted phrases and generates one or more summaries of the virtual meeting. Meeting notes summary program 106 transmits the summaries to the participants. Meeting notes summary program 106 includes speech to text module 108. Meeting notes summary program 106 is depicted and described in further detail with respect to FIG. 2, FIG. 3, FIG. 4, and FIG. 5.

Speech to text module 108 is one or more of a plurality of software programs in the field of computer speech recognition that convert audio feed of spoken language into text. This type of software may be valuable when a user needs to generate a lot of written content without a lot of manual typing. Speech to text module 108 receives spoken words from an audio or video conference call and transcribes the spoken words into written words. Speech to text module 108 displays the written words to meeting participants via meeting notes user interface 116. In the depicted embodiment, speech to text module 108 is a separate component of meeting notes summary program 106. In another embodiment, the function of speech to text module 108 may be fully integrated into meeting notes summary program 106.

Meeting notes database 110 and participant profile database 112 are each a repository for data used and generated by meeting notes summary program 106. Meeting notes database 110 and participant profile database 112 can each represent one or more databases. In the depicted embodiment, meeting notes database 110 and participant profile database 112 reside on server computer 104. In another embodiment, meeting notes database 110 and participant profile database 112 may each reside elsewhere within distributed data processing environment 100, provided meeting notes summary program 106 has access to meeting notes database 110 and participant profile database 112. In the depicted embodiment, meeting notes database 110 and participant profile database 112 are separate entities. In another embodiment, meeting notes database 110 and participant profile database 112 may be included in a combined database. A database is an organized collection of data. Meeting notes database 110 and participant profile database 112 can each be implemented with any type of storage device capable of storing data and configuration files that can be accessed and utilized by meeting notes summary program 106, such as a database server, a hard disk drive, or a flash memory. Meeting notes database 110 stores transcribed text of meetings as well as one or more customized summaries of the meetings. Meeting notes database 110 also stores extracted phrases from highlighted notes of meeting participants along with the sentence the extracted phrase corresponds to, the number of times the phrase was highlighted, and information associated with the participants that highlighted the phrases. Participant profile database 112 stores data associated with a meeting participant, including, but not limited to, name, address, phone number, email address, social network affiliation, job role, preferences for meeting summaries, etc.

The present invention may contain various accessible data sources, such as meeting notes database 110 and participant profile database 112, which may include personal data, content, or information the user, i.e., a participant, wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Meeting notes summary program 106 enables the authorized and secure processing of personal data. Meeting notes summary program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Meeting notes summary program 106 provides information regarding personal data and the nature (e.g., type, scope, purpose, duration, etc.) of the processing. Meeting notes summary program 106 provides the user with copies of stored personal data. Meeting notes summary program 106 allows the correction or completion of incorrect or incomplete personal data. Meeting notes summary program 106 allows the immediate deletion of personal data.

Participant computing device 114, participant computing device 118, and participant computing device 120 can each be one or more of a laptop computer, a tablet computer, a smart phone, smart watch, a smart speaker, or any programmable electronic device capable of communicating with various components and devices within distributed data processing environment 100, via network 102. Participant computing device 114, participant computing device 118, and participant computing device 120 may each be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch or a smart tattoo. In an embodiment, participant computing device 114, participant computing device 118, and/or participant computing device 120 may be integrated into a vehicle of the courier and the recipient, respectively. For example, participant computing device 114, participant computing device 118, and participant computing device 120 may each be a heads-up display in the windshield of the vehicle. In general, participant computing device 114, participant computing device 118, and participant computing device 120 each represents one or more programmable electronic devices or combination of programmable electronic devices capable of executing machine readable program instructions and communicating with other computing devices (not shown) within distributed data processing environment 100 via a network, such as network 102. Participant computing device 114, participant computing device 118, and participant computing device 120 each includes an instance of meeting notes user interface 116.

Meeting notes user interface 116 provides an interface between meeting notes summary program 106 on server computer 104 and a user of participant computing device 114, participant computing device 118, and/or participant computing device 120, hereinafter referred to as a participant. In one embodiment, meeting notes user interface 116 may be mobile application software. Mobile application software, or an "app," is a computer program designed to run on smart phones, tablet computers and other mobile devices. In one embodiment, meeting notes user interface 116 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. Meeting notes user interface 116 enables a meeting participant to interact with text generated during a virtual meeting. Meeting notes user interface 116 also enables a meeting participant to input user information and preferences into participant profile database 112.

Figure 2:
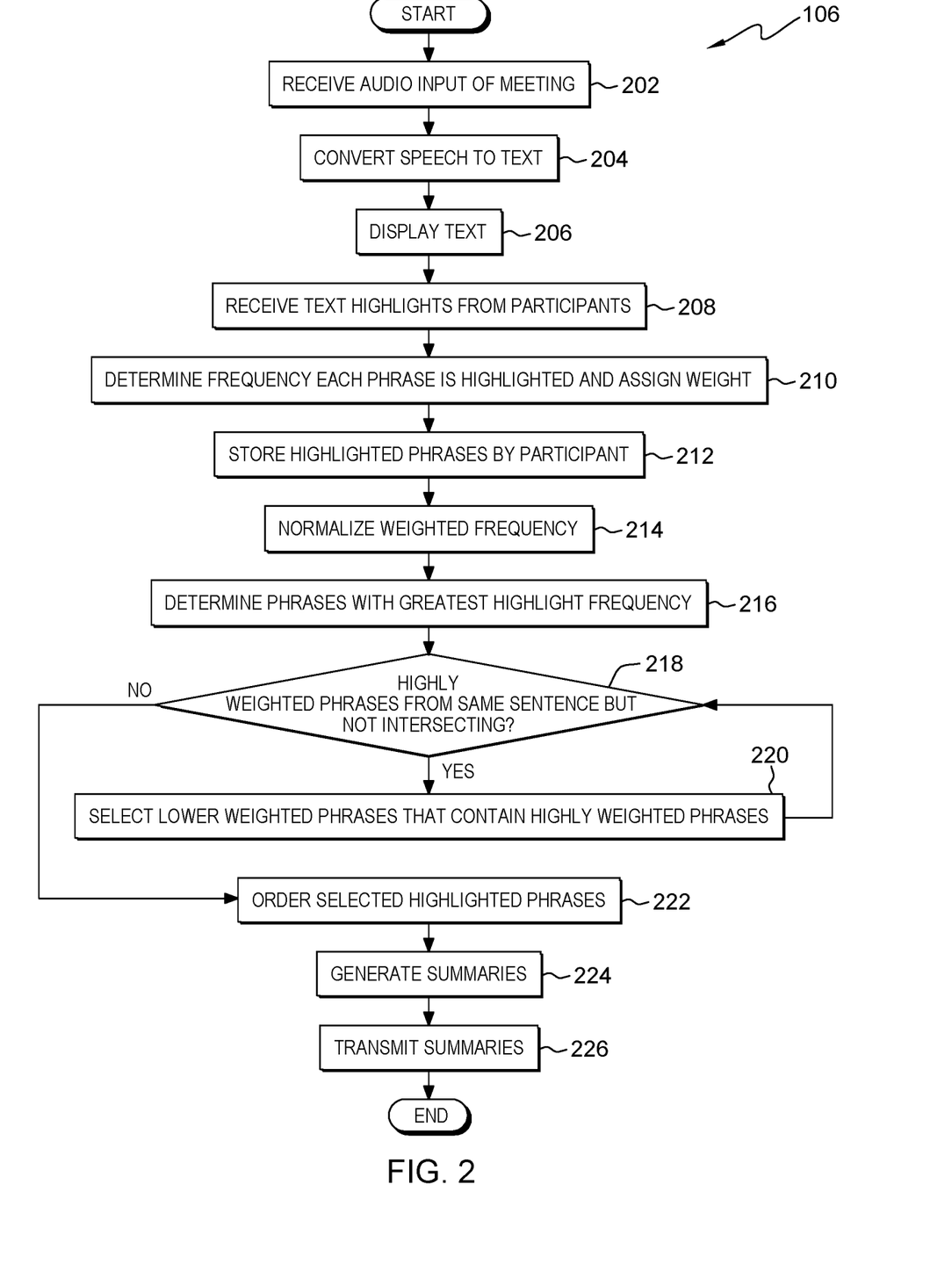
FIG. 2 is a flowchart depicting operational steps of a meeting notes summary program, on a server computer within the distributed data processing environment of FIG. 1, for customizing meeting notes for participants, in accordance with an embodiment of the present invention.

FIG. 2 is a flowchart depicting operational steps of meeting notes summary program 106, on server computer 104 within distributed data processing environment 100 of FIG. 1, for customizing meeting notes for participants, in accordance with an embodiment of the present invention.

Meeting notes summary program 106 receives audio input of a virtual meeting (step 202). In an embodiment, meeting notes summary program 106 receives audio input of a meeting that may be a video conference, a conference call, or a combined meeting where some participants attend in person while others attend virtually. The audio input includes speech utterances by one or more speakers and/or participants in the meeting. In an embodiment, meeting notes summary program 106 receives audio input from a microphone (not shown) into which the speaker is speaking. The microphone may be a component of a computing device, for example, a laptop, or of a telephone.

Meeting notes summary program 106 converts the speech from the audio input to text (step 204). Meeting notes summary program 106 uses speech to text technology to convert the received audio input into text. In an embodiment, meeting notes summary program 106 uses speech to text module 108 to convert the audio input into text. In an embodiment, meeting notes summary program 106 separates the text such that meeting notes summary program 106 identifies each speaker. In an embodiment, meeting notes summary program 106 stores the text in meeting notes database 110. In an embodiment, meeting notes summary program 106 may number each sentence or utterance and store the number in association with the text in meeting notes database 110.

Meeting notes summary program 106 displays the text to the virtual meeting participants (step 206). Meeting notes summary program 106 displays the text to participants in the virtual meeting, for example, users of participant computing devices 114, 118, and 120, via meeting notes user interface 116. In an embodiment, meeting notes summary program 106 displays the text in paragraph form. In another embodiment, meeting notes summary program 106 may display the text by speaker identification. In a further embodiment, meeting notes summary program 106 may display the text by each user preference, as defined and stored in participant profile database 112. For example, preferences may include, but are not limited to, font type, font size, font color, etc.

Meeting notes summary program 106 receives highlighted selections of the text from the participants (step 208). When participants in the virtual meeting, such as users of participant computing devices 114, 118, and 120, highlight portions of the text displayed on computing devices 114, 118, and 120 via meeting notes user interface 116, meeting notes summary program 106 receives the highlighted text. Participants in the virtual meeting highlight phrases that they find important. Each participant may have a unique perspective on which sentences, or phrases, are relevant. Participants may highlight the text using any available method associated with participant computing devices 114, 118, and 120. For example, if participant computing device 114 is a laptop, then the user of participant computing device 114 may highlight text by clicking and dragging a mouse associated with participant computing device 114 over some or all of the displayed text. In another example, if participant computing device 118 is a tablet, then the user of participant computing device 118 may highlight text by using a finger on a touch screen associated with participant computing device 118.

Meeting notes summary program 106 determines the frequency that each phrase is highlighted and assigns a weight (step 210). In an embodiment, meeting notes summary program 106 counts each phrase, sentence, or text segment included in the highlighted text received from the participants to determine the number of times each phrase is highlighted by the participants. Meeting notes summary program 106 assigns a weight to each highlighted phrase based on the determined frequency. For example, meeting notes summary program 106 may rank the phrases by decreasing order of frequency, assigning a higher weight to the higher ranked phrases.

Meeting notes summary program 106 stores the highlighted phrases by participant (step 212). In an embodiment, meeting notes summary program 106 stores the highlighted phrases in meeting notes database 110 by associating the highlighted phrases with the identification of the participant that highlighted the phrases. In an embodiment, in addition to the highlighted phrases and the participant that highlighted them, meeting notes summary program 106 also stores the sentence or utterance and/or sentence/utterance number from which the phrase was highlighted and the frequency that each phrase is highlighted, as determined in step 210, in association with the highlighted phrase and the associated participant. In a further embodiment, meeting notes summary program 106 may also store information about the participants which meeting notes summary program 106 may extract from participant profile database 112.

Meeting notes summary program 106 normalizes the weighted frequency (step 214). In an embodiment, meeting notes summary program 106 normalizes the weighted frequency of each phrase based on a volume of highlights from each participant. For example, if a particular participant, for example, the user of participant computing device 114, highlights a great majority of the text, then meeting notes summary program 106 adjusts the ranking of the phrases such that the text highlighted by the user of participant computing device 114 is less important than a user that only highlights key phrases. In another embodiment, meeting notes summary program 106 normalizes the weighted frequency of each phrase based on a participant's attendance duration at the meeting. For example, if the user of participant computing device 118 joins the meeting when the meeting is half over, or joins on time, but leaves the meeting soon after, then meeting notes summary program 106 adjusts the ranking of the phrases such that the text highlighted by the user of participant computing device 118 is less important than highlighted text selected by participants that attended the full meeting. In a further embodiment, meeting notes summary program 106 normalizes the weighted frequency of each phrase based on a total number of participants in the meeting at a given time. For example, if a number of people in the meeting that highlighted a particular phrase is greater than a pre-defined threshold percentage of participants in the meeting, then meeting notes summary program 106 adjusts the ranking of the particular phrase to be higher than the ranking of phrases highlighted by less than the pre-defined threshold number of participants. In another example, if in the first minutes of the virtual meeting there are a total of 20 participants and all 20 highlight a phrase, meeting notes summary program 106 considers the highlighted phrase as highly weighted since 100% of the participants highlighted the phrase. However, if later in the meeting there are 1000 participants and 100 participants highlight a second phrase, then meeting notes summary program 106 may weight the second phrase higher than the first phrase because although only 10% of the participants highlighted the second phrase, five times as many participants highlighted the second phrase as highlighted the first phrase. In yet another embodiment, meeting notes summary program 106 normalizes the weighted frequency of each phrase based on information known about the participants. For example, if a participant historically arrives late to a meeting, then meeting notes summary program 106 adjusts the ranking such that text highlighted by the perpetually late participant is less than those participants who historically arrive on time. In another example, meeting notes summary program 106 may adjust the ranking such that text highlighted by a participant whose role is project manager ranks higher than text highlighted by a participant whose role is test engineer. In one embodiment, meeting notes summary program 106 uses a natural language processing (NLP) term frequency-inverse document frequency (TF-IDF) method for normalizing terms within a single participant's highlighted text and/or across multiple participants' highlighted text. A TF-IDF weight is a statistical measure often used in information retrieval and text mining to evaluate how important a word is to a document in a collection or corpus. The importance increases proportionally to the number of times a word appears in the document but is offset by the frequency of the word in the corpus.

In an embodiment where meeting notes summary program 106 includes a machine learning component, meeting notes summary program 106 can detect patterns in note taking and text highlighting by individual participants in previous meetings to determine note taking styles and preferences associated with individual participants as well as various groups of participants, such as those participants with the same job role. In the embodiment, meeting notes summary program 106 can adjust the weight of highlighted text based on the participants historic highlighting and/or on the historic highlighting of other participants with similar historic highlights. For example, if a participant historically highlights very little text, then meeting notes summary program 106 can adjust the ranking such that meeting notes summary program 106 ranks text highlighted by the participant lower than a participant that historically highlights a more significant quantity of text.

Meeting notes summary program 106 determines which phrases have the greatest highlight frequency (step 216). In an embodiment, meeting notes summary program 106 determines which phrases have the greatest highlight frequency based on the normalized frequency. In an embodiment, the highest frequency is a pre-defined threshold quantity. In another embodiment, meeting notes summary program 106 determines the highest frequency based on the actual data. In an embodiment, meeting notes summary program 106 determines whether the number of phrases with the highest frequency exceeds a pre-defined threshold quantity of highlighted phrases. In the embodiment, meeting notes summary program 106 may drop off some of the highlighted phrases based on pre-defined criteria. For example, if the threshold number of phrases is ten and the highest frequency is three, and the number of phrases with a frequency of three is twelve, then meeting notes summary program 106 eliminates two of the phrases based on, for example, the historical note taking of a participant which indicates the participant highlights most of the text. In another example, meeting notes summary program 106 may drop phrases that include terms that are not historically common, based on previous meeting notes.

Meeting notes summary program 106 determines whether any of the highly weighted phrases are from the same sentence but not intersecting (decision block 218). During the meeting, some participants may highlight one or more phrases from a particular sentence while others highlight the whole sentence. Meeting notes summary program 106 compares the phrases that are normalized to have the highest weight and determines whether any of the highly weighted phrases are from the same sentence but do not intersect or overlap.

If meeting notes summary program 106 determines any of the highlighted phrases are from the same sentence but not intersecting ("yes" branch, decision block 218), then meeting notes summary program 106 selects lower weighted phrases that contain the highly weighted phrases (step 220). In order to capture phrases that enable meeting notes summary program 106 to generate a contextual summary, meeting notes summary program 106 extracts additional phrases that, although weighted lower than some phrases, include the highly weighted phrases. The details of this step will be discussed further with respect to FIG. 4 and FIG. 5. Responsive to extracting lower weight phrases, meeting notes summary program 106 returns to decision block 218 to confirm that meeting notes summary program 106 extracted sentences that contain the highly weighted phrases. Meeting notes summary program 106 continues this process recursively until meeting notes summary program 106 selects the sentences containing the highly weighted phrases. In an embodiment, meeting notes summary program 106 extracts lower weighted phrases until a pre-defined threshold number of words in a sentence is met. For example, if there are greater than three words in a sentence highlighted by one or more participants, and at least one other participant highlighted the full sentence, then meeting notes summary program 106 selects the full sentence.

Meeting notes summary program 106 orders the selected highlighted phrases (step 222). In an embodiment, meeting notes summary program 106 puts the selected highlighted phrases and/or sentences in chronological order, i.e., the order in which the phrases were spoken in the meeting.

Meeting notes summary program 106 generates one or more summaries of the virtual meeting (step 224). Meeting notes summary program 106 generates customized summaries based on various criteria. In one embodiment, meeting notes summary program 106 generates customized summaries for each participant based on participant preferences stored in participant profile database 112. For example, a participant may prefer a short, medium, or long summary, which may be defined by a threshold number of words, paragraphs, or pages. In another example, the length of the summary may depend on the weighting of the highlighted text, such that a short summary includes only text highlighted by many participants, while a long summary may additionally include text highlighted by only a few participants. In addition, a preference for the length of the summary may depend on the topic of the meeting. In an embodiment, meeting notes user interface 116 may include a slider bar with which the participant can indicate the preferred length of the summary. In another example, a participant may prefer a summary based on job role or similarities to other participants. For example, a participant whose job role is software developer may prefer a summary that is similar to other participants with the job role of software developer. In another embodiment, meeting notes summary program 106 may generate a variety of summaries with different lengths, based on pre-defined thresholds for the number of highlighted phrases or sentences in each summary, such as for a short summary, a medium summary, or a long summary, where the criteria for summary generation does not include participant preferences.

In an embodiment, meeting notes summary program 106 may generate a summary for a meeting invitee that did not attend the meeting or a participant that did not take any notes. In the embodiment, meeting notes summary program 106 may generate the summary based on information about the non-attendee or the non-note taker stored in participant profile database 112, such as preferences for meeting summaries. In another embodiment, if no information about a participant or a non-attendee exists in participant profile database 112, then meeting notes summary program 106 may generate a general summary based on common profile information of the majority of the participants. In an embodiment where meeting notes summary program 106 includes a machine learning component, meeting notes summary program 106 may generate a summary based on a detected pattern of note taking by the non-attendee or non-note taker from historic notes and highlights from other meetings. In an embodiment, meeting notes summary program 106 may take the preferences for length of the summary into account when normalizing the weight associated with highlighted text, as discussed with respect to step 214.

Meeting notes summary program 106 transmits the summaries to the participants (step 226). In an embodiment, meeting notes summary program 106 transmits the customized summary via an email or text message to each of the participants. In another embodiment, meeting notes summary program 106 also sends a customized summary to any invitees that did not attend the virtual meeting. In a further embodiment, meeting notes summary program 106 may also send the participants' individual notes, i.e., the text the participant highlighted during the meeting, such that the participant has a record of the text that the participant felt was important or relevant during the meeting.

Figure 3A:
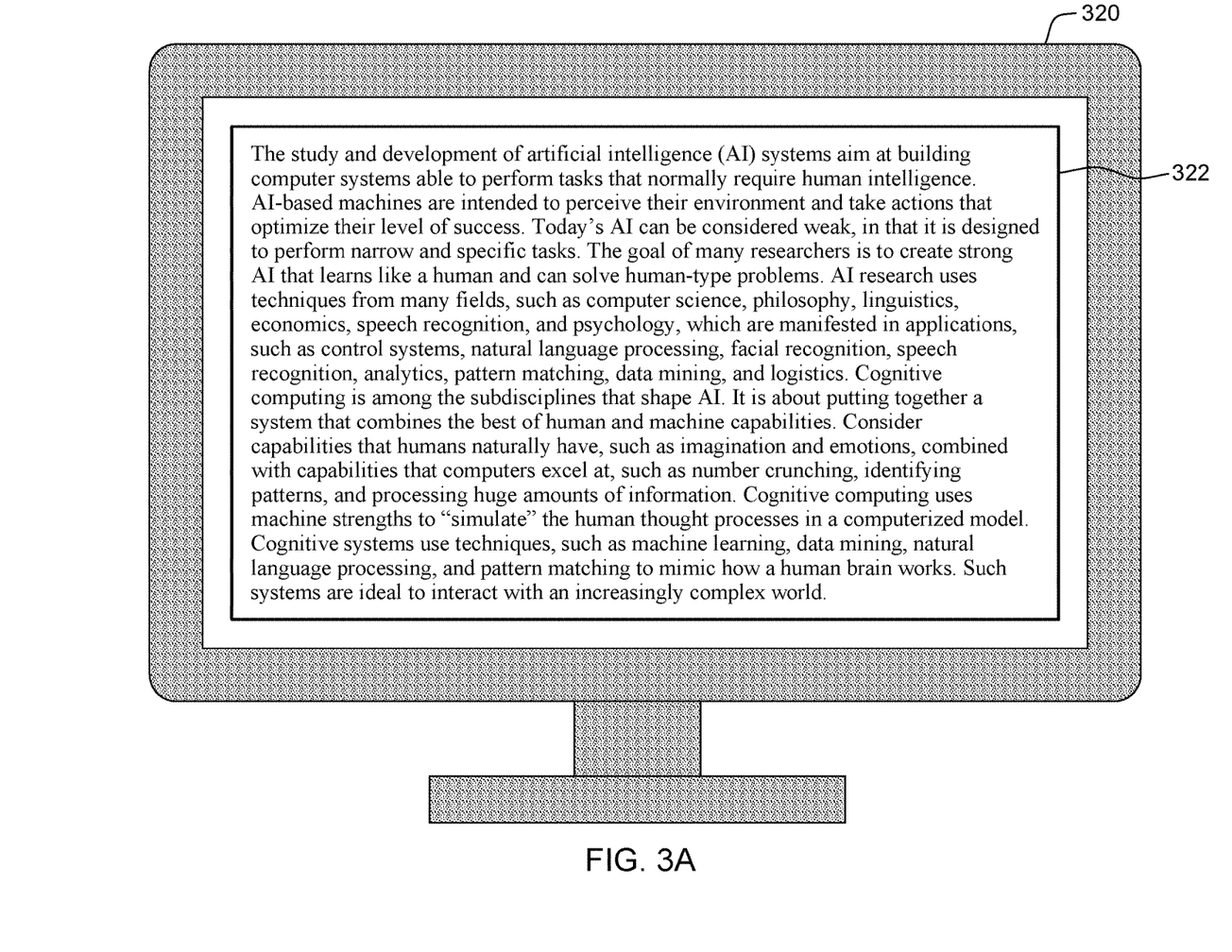
FIG. 3A illustrates a meeting notes user interface for the meeting notes summary program, on a participant computing device within the distributed data processing environment of FIG. 1, in accordance with an embodiment of the present invention.

FIG. 3A illustrates meeting notes user interface 116 for meeting notes summary program 106, on participant computing device 114 within distributed data processing environment 100 of FIG. 1, in accordance with an embodiment of the present invention. In FIG. 3A, monitor 320, associated with a participant computing device such as participant computing device 114, displays, via meeting notes user interface 116, a transcription of text 322 which meeting notes summary program 106 converted from audio content spoken during a meeting using speech to text module 108.

Figure 3B:
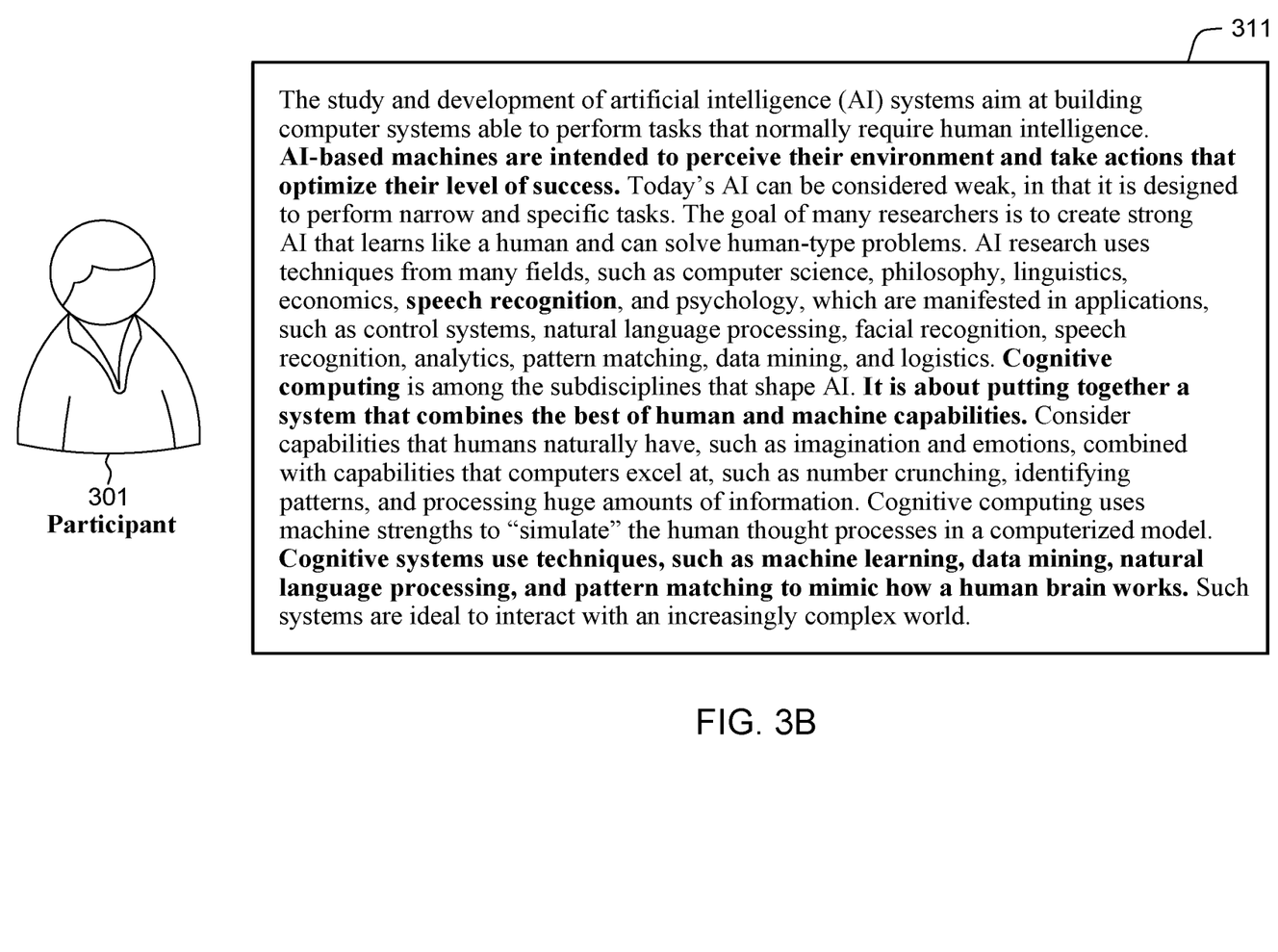
FIG. 3B illustrates a selection of text by a participant in a virtual meeting.

FIG. 3B illustrates a selection of text by participant 301 in a virtual meeting. Participant 301, a user of participant computing device 114, highlighted text within text 322, which is depicted as bold text in box 311.

Figure 3C:
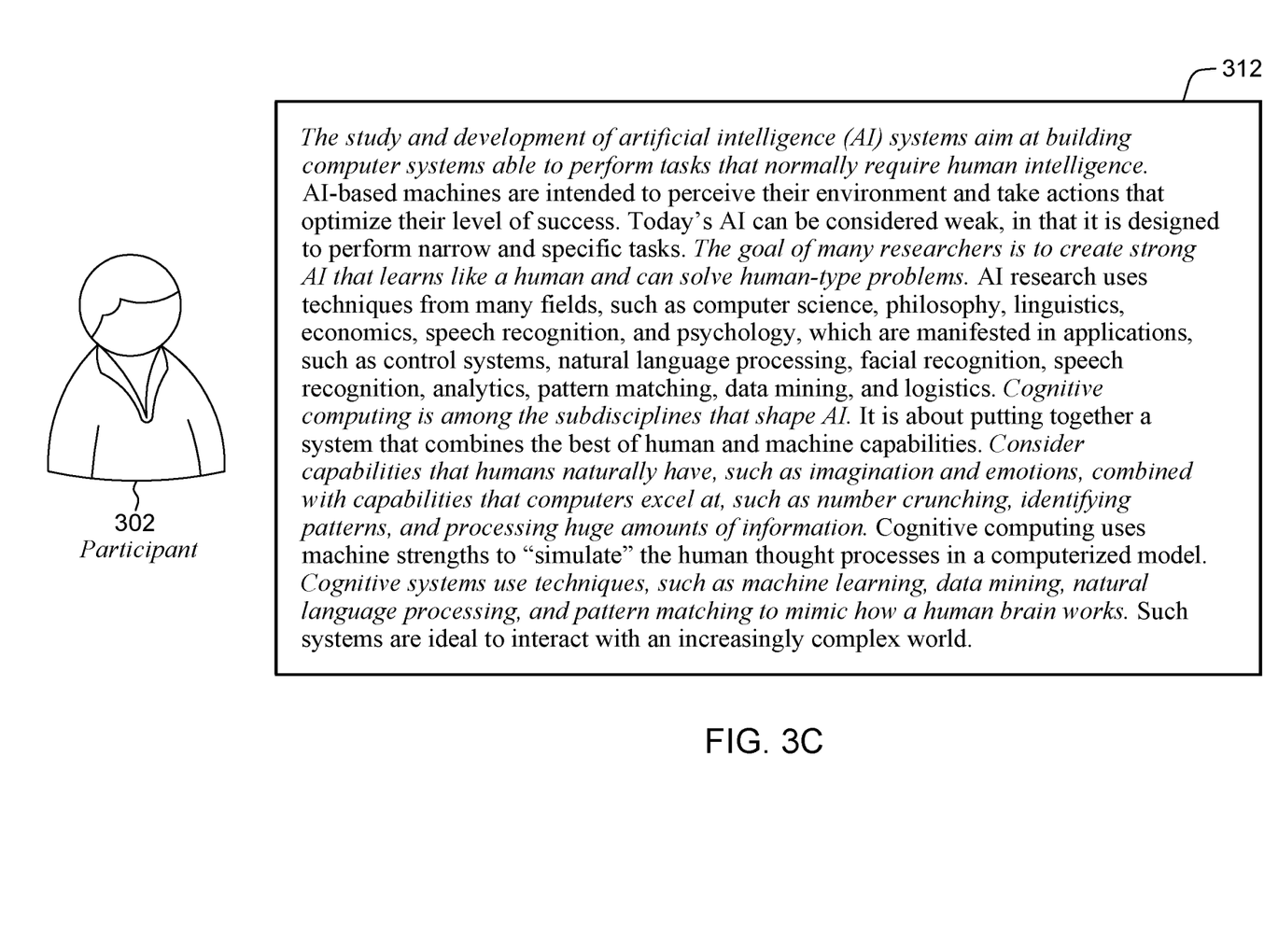
FIG. 3C illustrates a selection of text by a participant in the virtual meeting.

FIG. 3C illustrates a selection of text by participant 302 in the virtual meeting. Participant 302, a user of participant computing device 118, highlighted text within text 322, which is depicted as italic text in box 312.

Figure 3D:
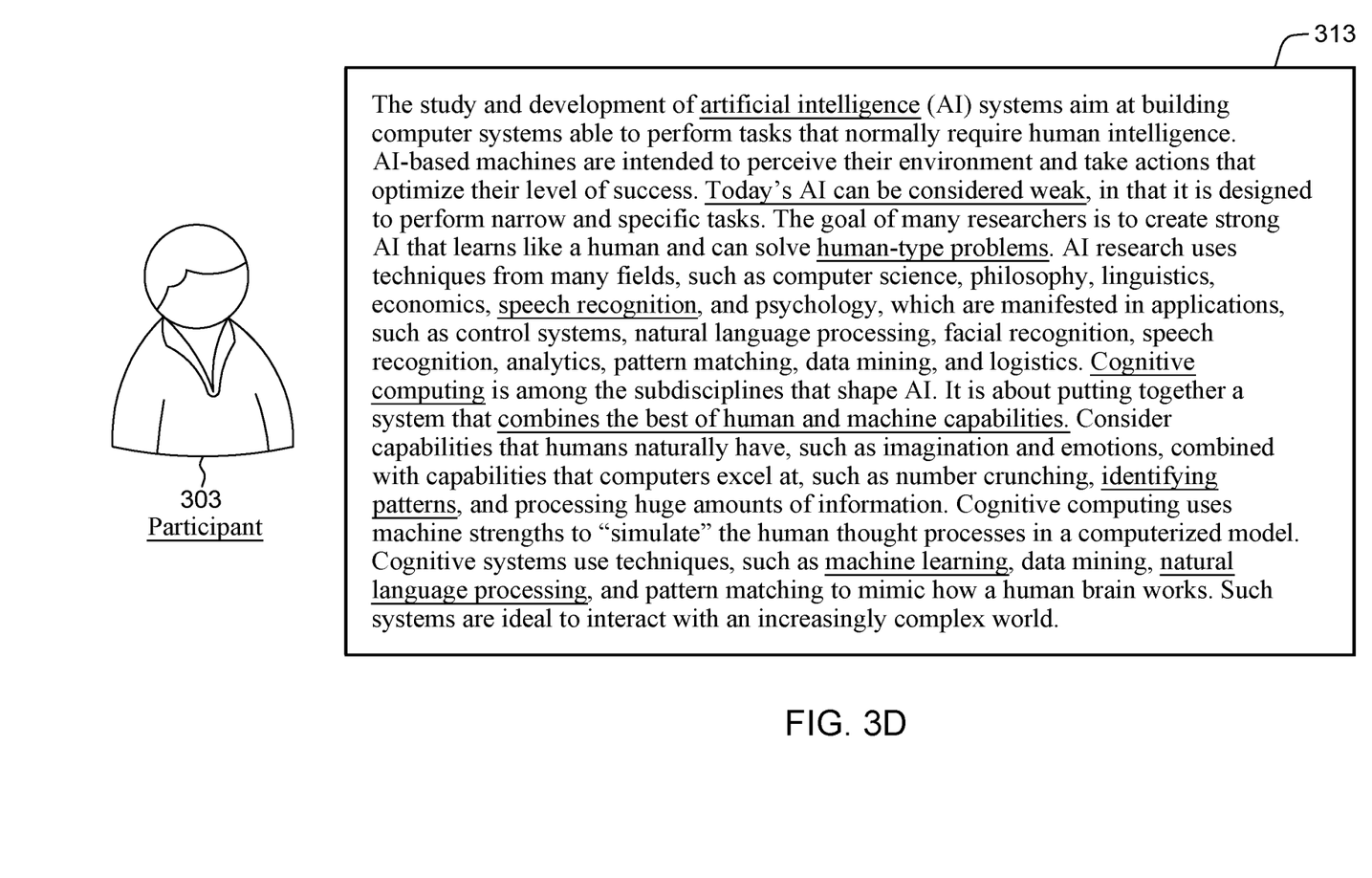
FIG. 3D illustrates a selection of text by a participant in the virtual meeting.

FIG. 3D illustrates a selection of text by participant 303 in the virtual meeting. Participant 303, a user of participant computing device 120, highlighted text within text 322, which is depicted as underlined text in box 312.

Figure 4:
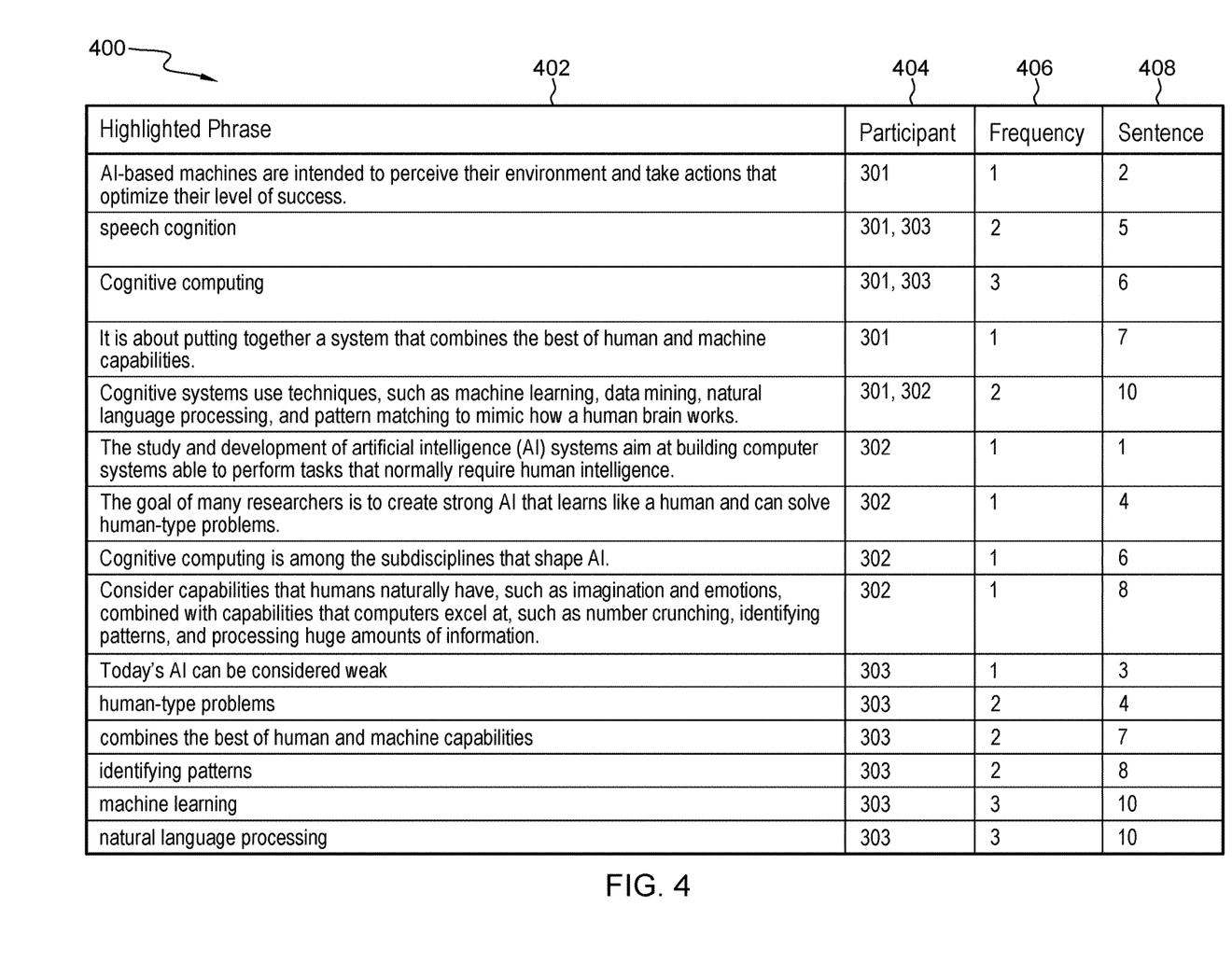
FIG. 4 depicts a table as an example of the operation of the meeting notes summary program, in accordance with an embodiment of the present invention.

FIG. 4 depicts table 400 as an example of the operation of meeting notes summary program 106, in accordance with an embodiment of the present invention. Table 400 depicts an embodiment of data stored by meeting notes summary program 106 in meeting notes database 110, as described with respect to step 212 of FIG. 2. Column 402 lists phrases from text 322 of FIG. 3A which were highlighted by participants 301, 302, and 303. Column 404 lists the participants that highlighted each phrase. Column 406 lists the frequency at which each phrase was highlighted, as discussed with respect to step 210 of FIG. 2. As shown in column 406, the frequency is the actual number of times the phrase was highlighted and does not reflect a normalized weight which meeting notes summary program 106 generates later in the process. Column 408 lists the chronological number of the sentence in the paragraph.

Figure 5:
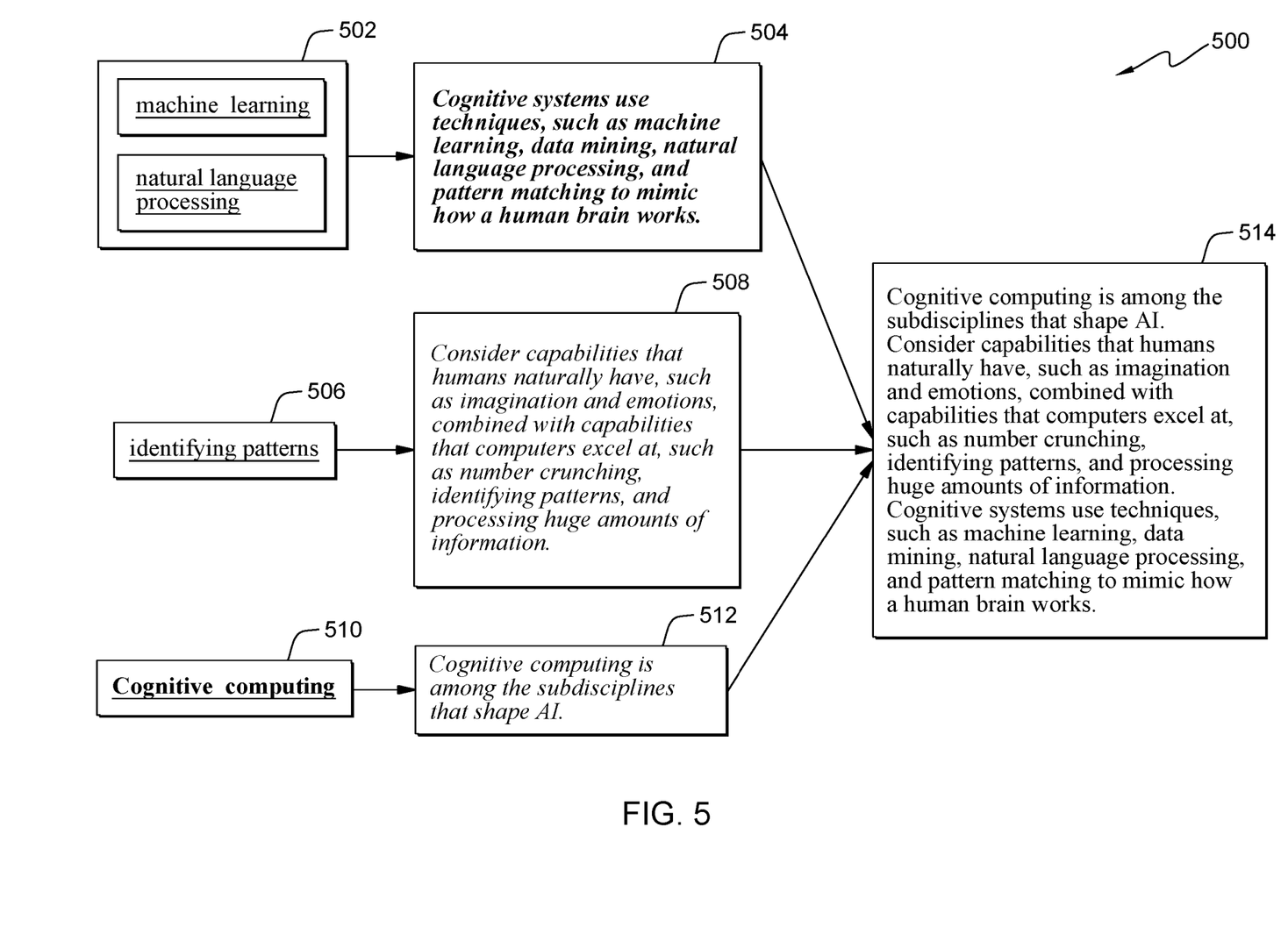
FIG. 5 depicts another example of the operation of the meeting notes summary program, in accordance with an embodiment of the present invention.

FIG. 5 depicts example 500 of the operation of meeting notes summary program 106, in accordance with an embodiment of the present invention. Example 500 includes highlighted phrases from text 322 of FIG. 3. Box 502 includes two phrases highlighted by participant 303, shown underlined. Box 504 includes sentence 10, as displayed in Table 400 of FIG. 4, which was highlighted by both participant 301 and participant 302, shown bold and italicized. The two phrases of box 502 are highly weighted and from the same sentence, but do not intersect, as described with respect to decision block 218. As described with respect to step 220, meeting notes summary program 106 selects sentence 10, with a frequency of 2, because sentence 10 contains the two phrases of box 502, which each have a frequency of 3. Meeting notes summary program 106 uses similar logic for selecting sentence 8, as displayed in Table 400 of FIG. 4, shown in box 508 and highlighted by participant 302, shown italicized. Sentence 8 includes the phrase in box 506, highlighted by participant 303, shown underlined. Further, meeting notes summary program 106 uses similar logic for selecting sentence 6, as displayed in Table 400 of FIG. 4, shown in box 512 and highlighted by participant 302, shown italicized. Sentence 6 includes the phrase in box 510, highlighted by participant 301 and participant 303, shown bold and underlined. As described with respect to step 222 of FIG. 2, meeting notes summary program 106 aggregates and orders the selected text based on the order in which the phrases were spoken in the meeting. As described with respect to step 224, meeting notes summary program 106 generates a summary of the meeting using the selected highlighted text, as shown in box 514.

Figure 6:
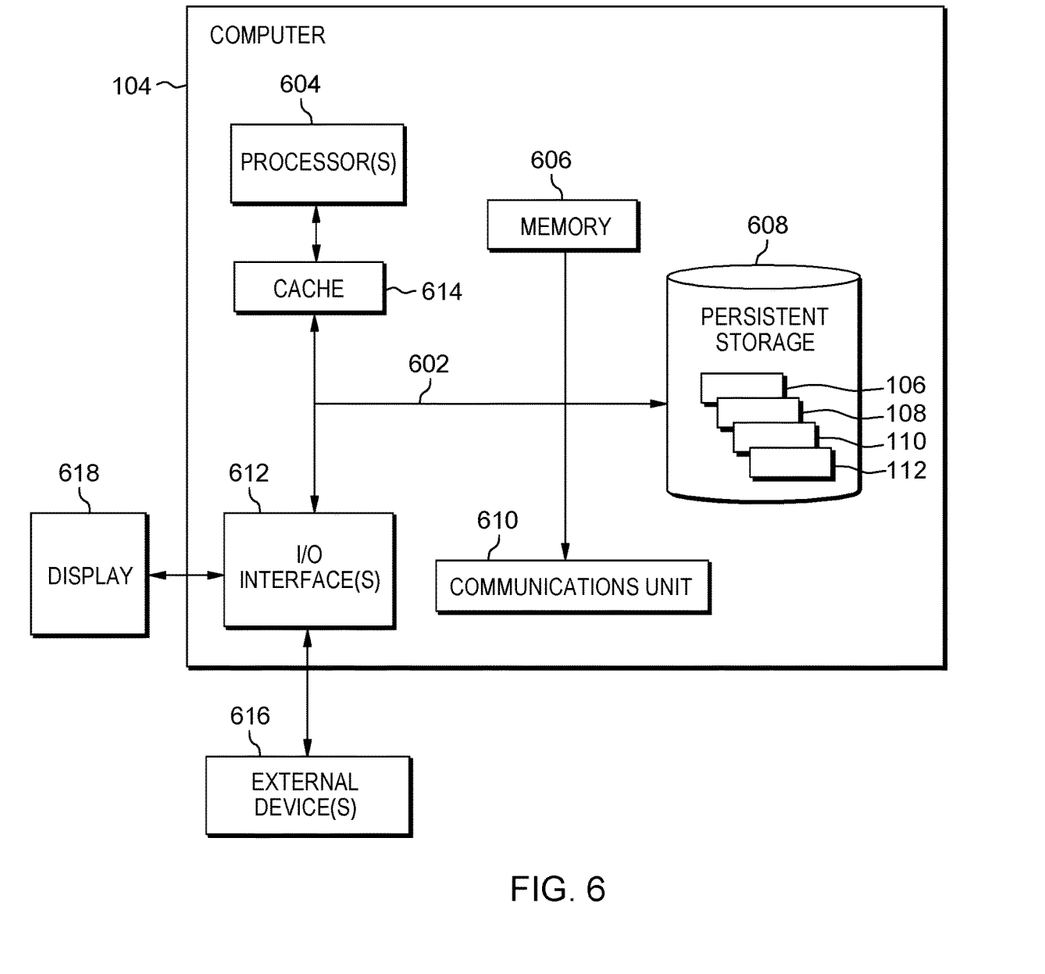
FIG. 6 depicts a block diagram of components of the server computer executing the meeting notes summary program within the distributed data processing environment of FIG. 1, in accordance with an embodiment of the present invention.

FIG. 6 depicts a block diagram of components of server computer 104 within distributed data processing environment 100 of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

Server computer 104 can include processor(s) 604, cache 614, memory 606, persistent storage 608, communications unit 610, input/output (I/O) interface(s) 612 and communications fabric 602. Communications fabric 602 provides communications between cache 614, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM). In general, memory 606 can include any suitable volatile or non-volatile computer readable storage media. Cache 614 is a fast memory that enhances the performance of processor(s) 604 by holding recently accessed data, and data near recently accessed data, from memory 606.

Program instructions and data used to practice embodiments of the present invention, e.g., meeting notes summary program 106, speech to text module 108, meeting notes database 110, and participant profile database 112, are stored in persistent storage 608 for execution and/or access by one or more of the respective processor(s) 604 of server computer 104 via cache 614. In this embodiment, persistent storage 608 includes a magnetic hard disk drive. Alternatively, or in addition to a magnetic hard disk drive, persistent storage 608 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of participant computing device 114, participant computing device 118, and participant computing device 120. In these examples, communications unit 610 includes one or more network interface cards. Communications unit 610 may provide communications through the use of either or both physical and wireless communications links. Meeting notes summary program 106, speech to text module 108, meeting notes database 110, and participant profile database 112, and other programs and data used for implementation of the present invention, may be downloaded to persistent storage 608 of server computer 104 through communications unit 610.

I/O interface(s) 612 allows for input and output of data with other devices that may be connected to server computer 104. For example, I/O interface(s) 612 may provide a connection to external device(s) 616 such as a keyboard, a keypad, a touch screen, a microphone, a digital camera, and/or some other suitable input device. External device(s) 616 can also include portable computer readable storage media such as, for example, thumb drives, portable optical or magnetic disks, and memory cards. Software and data used to practice embodiments of the present invention, e.g., meeting notes summary program 106, speech to text module 108, meeting notes database 110, and participant profile database 112 on server computer 104, can be stored on such portable computer readable storage media and can be loaded onto persistent storage 608 via I/O interface(s) 612. I/O interface(s) 612 also connect to a display 618.

Display 618 provides a mechanism to display data to a user and may be, for example, a computer monitor. Display 618 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method, the method comprising:
   receiving, by one or more computer processors, audio input of a virtual meeting;
   converting, by one or more computer processors, the audio input to text;
   displaying, by one or more computer processors, the text to a plurality of meeting participants;
   receiving, by one or more computer processors, one or more highlighted phrases of the text from the plurality of meeting participants;
   determining, by one or more computer processors, a frequency of highlighting of each of the one or more highlighted phrases;
   assigning, by one or more computer processors, a weight to each of the one or more highlighted phrases based on the frequency of highlighting;
   normalizing, by one or more computer processors, the assigned weight based on one or more criteria, wherein the one or more criteria for normalizing the assigned weight include an attendance duration of each of the plurality of meeting participants at the virtual meeting;
   based on the normalized assigned weight, determining, by one or more computer processors, one or more phrases with a normalized high frequency of highlighting;
   ordering, by one or more computer processors, the one or more phrases with the normalized high frequency of highlighting based on a chronological order of the phrases in the audio input;
   determining, by one or more computer processors, one or more preferences of a first meeting participant of the plurality of meeting participants associated with a meeting summary;
   generating, by one or more computer processors, a customized summary of the virtual meeting for the first meeting participant of the plurality of meeting participants based on the ordered one or more phrases with the normalized high frequency of highlighting and on the one or more preferences; and
   transmitting, by one or more computer processors, the customized summary to the first meeting participant of the plurality of meeting participants.

2. The method of claim 1, further comprising:
   determining, by one or more computer processors, one or more highly weighted phrases from a same sentence do not intersect in the sentence; and
   selecting, by one or more computer processors, one or more lower weighted phrases from the sentence that contain the one or more highly weighted phrases.

3. The method of claim 1, wherein the one or more criteria for normalizing the assigned weight include at least one of: a volume of highlights from each of the plurality of meeting participants, a total number of meeting participants in the virtual meeting at a given time, information known about the meeting participants, historic highlighting of each of the plurality of meeting participants, and historic highlighting of meeting participants with similar historic highlights.

4. The method of claim 1, further comprising, storing, by one or more computer processors, each of the one or more highlighted phrases of the text in association with a meeting participant from which the highlighted phrase was received.

5. The method of claim 4, further comprising, storing, by one or more computer processors, in association with each of the one or more highlighted phrases of the text, a frequency at which each of the one or more highlighted phrases of the text was highlighted, a sentence from which each of the one or more highlighted phrases of the text was highlighted, and a number of the sentence from which each of the one or more highlighted phrases of the text was highlighted.

6. The method of claim 4, further comprising, transmitting, by one or more computer processors, the one or more highlighted phrases of the text from each of the plurality of meeting participants to a corresponding participant from which the one or more highlighted phrases was received.

7. A computer program product, the computer program product comprising:
   one or more computer readable storage media and program instructions collectively stored on the one or more computer readable storage media, the stored program instructions comprising:
   program instructions to receive audio input of a virtual meeting;
   program instructions to convert the audio input to text;
   program instructions to display the text to a plurality of meeting participants;
   program instructions to receive one or more highlighted phrases of the text from the plurality of meeting participants;
   program instructions to determine a frequency of highlighting of each of the one or more highlighted phrases;
   program instructions to assign a weight to each of the one or more highlighted phrases based on the frequency of highlighting;
   program instructions to normalize the assigned weight based on one or more criteria, wherein the one or more criteria for normalizing the assigned weight include an attendance duration of each of the plurality of meeting participants at the virtual meeting;
   based on the normalized assigned weight, program instructions to determine one or more phrases with a normalized high frequency of highlighting;
   program instructions to order the one or more phrases with the normalized high frequency of highlighting based on a chronological order of the phrases in the audio input;
   program instructions to determine one or more preferences of a first meeting participant of the plurality of meeting participants associated with a meeting summary;
   program instructions to generate a customized summary of the virtual meeting for the first meeting participant of the plurality of meeting participants based on the ordered one or more phrases with the normalized high frequency of highlighting and on the one or more preferences; and
   program instructions to transmit the customized summary to the first meeting participant of the plurality of meeting participants.

8. The computer program product of claim 7, the stored program instructions further comprising:
   program instructions to determine one or more highly weighted phrases from a same sentence do not intersect in the sentence; and
   program instructions to select one or more lower weighted phrases from the sentence that contain the one or more highly weighted phrases.

9. The computer program product of claim 7, wherein the one or more criteria for normalizing the assigned weight include at least one of: a volume of highlights from each of the plurality of meeting participants, a total number of meeting participants in the virtual meeting at a given time, information known about the meeting participants, historic highlighting of each of the plurality of meeting participants, and historic highlighting of meeting participants with similar historic highlights.

10. The computer program product of claim 7, the stored program instructions further comprising, program instructions to store each of the one or more highlighted phrases of the text in association with a meeting participant from which the highlighted phrase was received.

11. The computer program product of claim 10, the stored program instructions further comprising, program instructions to store in association with each of the one or more highlighted phrases of the text, a frequency at which each of the one or more highlighted phrases of the text was highlighted, a sentence from which each of the one or more highlighted phrases of the text was highlighted, and a number of the sentence from which each of the one or more highlighted phrases of the text was highlighted.

12. The computer program product of claim 7, the stored program instructions further comprising, program instructions to transmit the one or more highlighted phrases of the text from each of the plurality of meeting participants to a corresponding participant from which the one or more highlighted phrases was received.

13. A computer system, the computer system comprising:
   one or more computer processors;
   one or more computer readable storage media;
   program instructions collectively stored on the one or more computer readable storage media for execution by at least one of the one or more computer processors, the stored program instructions comprising:
   program instructions to receive audio input of a virtual meeting;
   program instructions to convert the audio input to text;
   program instructions to display the text to a plurality of meeting participants;
   program instructions to receive one or more highlighted phrases of the text from the plurality of meeting participants;
   program instructions to determine a frequency of highlighting of each of the one or more highlighted phrases;
   program instructions to assign a weight to each of the one or more highlighted phrases based on the frequency of highlighting;
   program instructions to normalize the assigned weight based on one or more criteria, wherein the one or more criteria for normalizing the assigned weight include an attendance duration of each of the plurality of meeting participants at the virtual meeting;
   based on the normalized assigned weight, program instructions to determine one or more phrases with a normalized high frequency of highlighting;
   program instructions to order the one or more phrases with the normalized high frequency of highlighting based on a chronological order of the phrases in the audio input;
   program instructions to determine one or more preferences of a first meeting participant of the plurality of meeting participants associated with a meeting summary;
   program instructions to generate a customized summary of the virtual meeting for the first meeting participant of the plurality of meeting participants based on the ordered one or more phrases with the normalized high frequency of highlighting and on the one or more preferences; and
   program instructions to transmit the customized summary to the first meeting participant of the plurality of meeting participants.

14. The computer system of claim 13, the stored program instructions further comprising:
   program instructions to determine one or more highly weighted phrases from a same sentence do not intersect in the sentence; and
   program instructions to select one or more lower weighted phrases from the sentence that contain the one or more highly weighted phrases.

15. The computer system of claim 13, wherein the one or more criteria for normalizing the assigned weight include at least one of: a volume of highlights from each of the plurality of meeting participants, a total number of meeting participants in the virtual meeting at a given time, information known about the meeting participants, historic highlighting of each of the plurality of meeting participants, and historic highlighting of meeting participants with similar historic highlights.

16. The computer system of claim 13, the stored program instructions further comprising, program instructions to store each of the one or more highlighted phrases of the text in association with a meeting participant from which the highlighted phrase was received.

17. The computer system of claim 13, the stored program instructions further comprising, program instructions to transmit the one or more highlighted phrases of the text from each of the plurality of meeting participants to a corresponding participant from which the one or more highlighted phrases was received.

* * * * *